United States Patent
Morgan

(10) Patent No.: US 11,583,739 B2
(45) Date of Patent: *Feb. 21, 2023

(54) REAR STORAGE FOR GOLF CARS

(71) Applicant: Textron Innovations Inc., Providence, RI (US)

(72) Inventor: Paul Morgan, Appling, GA (US)

(73) Assignee: TEXTRON INNOVATIONS INC., Providence, RI (US)

(*) Notice: Subject to any disclaimer, the term of this patent is extended or adjusted under 35 U.S.C. 154(b) by 173 days.

This patent is subject to a terminal disclaimer.

(21) Appl. No.: 17/114,794

(22) Filed: Dec. 8, 2020

(65) Prior Publication Data

US 2021/0086047 A1    Mar. 25, 2021

Related U.S. Application Data

(63) Continuation of application No. 16/241,603, filed on Jan. 7, 2019, now Pat. No. 10,881,929.

(51) Int. Cl.
  *A63B 55/60* (2015.01)
  *B62D 25/08* (2006.01)
  *A63B 71/00* (2006.01)

(52) U.S. Cl.
  CPC .......... *A63B 55/61* (2015.10); *A63B 71/0036* (2013.01); *B62D 25/08* (2013.01); *A63B 2225/50* (2013.01); *A63B 2225/682* (2013.01); *A63B 2225/685* (2013.01); *A63B 2225/687* (2013.01); *B60Y 2200/86* (2013.01); *B62B 2202/404* (2013.01)

(58) Field of Classification Search
  CPC ................ A63B 55/61; A63B 71/0036; A63B 2225/682; A63B 2225/685; A63B 2225/687; A63B 2225/50; B62D 25/08; B60Y 2200/86; B62B 2202/404
  USPC ........................................................ 296/37.8
  See application file for complete search history.

(56) References Cited

U.S. PATENT DOCUMENTS

| 7,093,872 B2 | 8/2006 | Stanfield et al. |
| 7,585,010 B2 | 9/2009 | Hardy et al. |
| 8,387,734 B2 * | 3/2013 | Krosschell ............... B60N 2/38 296/64 |
| 10,881,929 B2 * | 1/2021 | Morgan ................. A63B 55/61 |

* cited by examiner

*Primary Examiner* — D Glenn Dayoan
*Assistant Examiner* — Dana D Ivey
(74) *Attorney, Agent, or Firm* — Sandberg, Phoenix & von Gotard, P.C.

(57) ABSTRACT

An auxiliary storage compartment for a golf car, wherein the auxiliary storage compartment comprises a storage receptacle disposed on a rear deck of a body of a golf car behind and accessible from a seating structure of the golf car. In various instances, the storage receptacle comprising at least one sidewall that defines an interior storage space of the storage receptacle.

15 Claims, 6 Drawing Sheets

REAR STORAGE FOR GOLF CARS

CROSS-REFERENCE TO RELATED APPLICATIONS

This application is a continuation of U.S. patent application Ser. No. 16/241,603 filed Jan. 7, 2019, the disclosure of which is incorporated herein by reference in its entirety.

FIELD

The present teachings relate to storage areas for personal items of golf car passengers, and more particularly to a personal items storage system located behind a seating structure of a golf car.

BACKGROUND

The statements in this section merely provide background information related to the present disclosure and may not constitute prior art.

Known golf cars are often lacking is storage areas and/or storage bins, and or storage compartments that can be utilized by passengers of the golf car for storing personal items, such as cell phones, keys, range finders, towels, golf balls, golf club head covers, hats, sun glasses, etc.

SUMMARY

In various embodiments, the present disclosure provides an auxiliary storage compartment for a golf car, wherein the auxiliary storage compartment comprises a storage receptacle disposed on a rear deck of a body of a golf car behind and accessible from a seating structure of the golf car. In various instances, the storage receptacle comprising at least one sidewall that defines an interior storage space of the storage receptacle.

In various other embodiments, the present disclosure provides a golf car, wherein the golf car comprise a chassis, a pair of front wheels and a pair of rear wheels operationally connected to the chassis, a passenger compartment supported by the chassis, a body mounted to the chassis, and an auxiliary storage compartment. The passenger compartment generally includes a dash console, a floorboard, and a passenger seating structure. The body generally comprising a front cowl assembly disposed forward of the passenger compartment, and a rear deck and bag well assembly disposed at least partially rearward of the passenger compartment. In various instances, the auxiliary storage compartment comprises a storage receptacle disposed on a rear deck of the rear deck and bag well assembly of the body behind and accessible from the seating structure. In various instances, the storage receptacle comprising at least one sidewall that defines an interior storage space of the storage receptacle.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
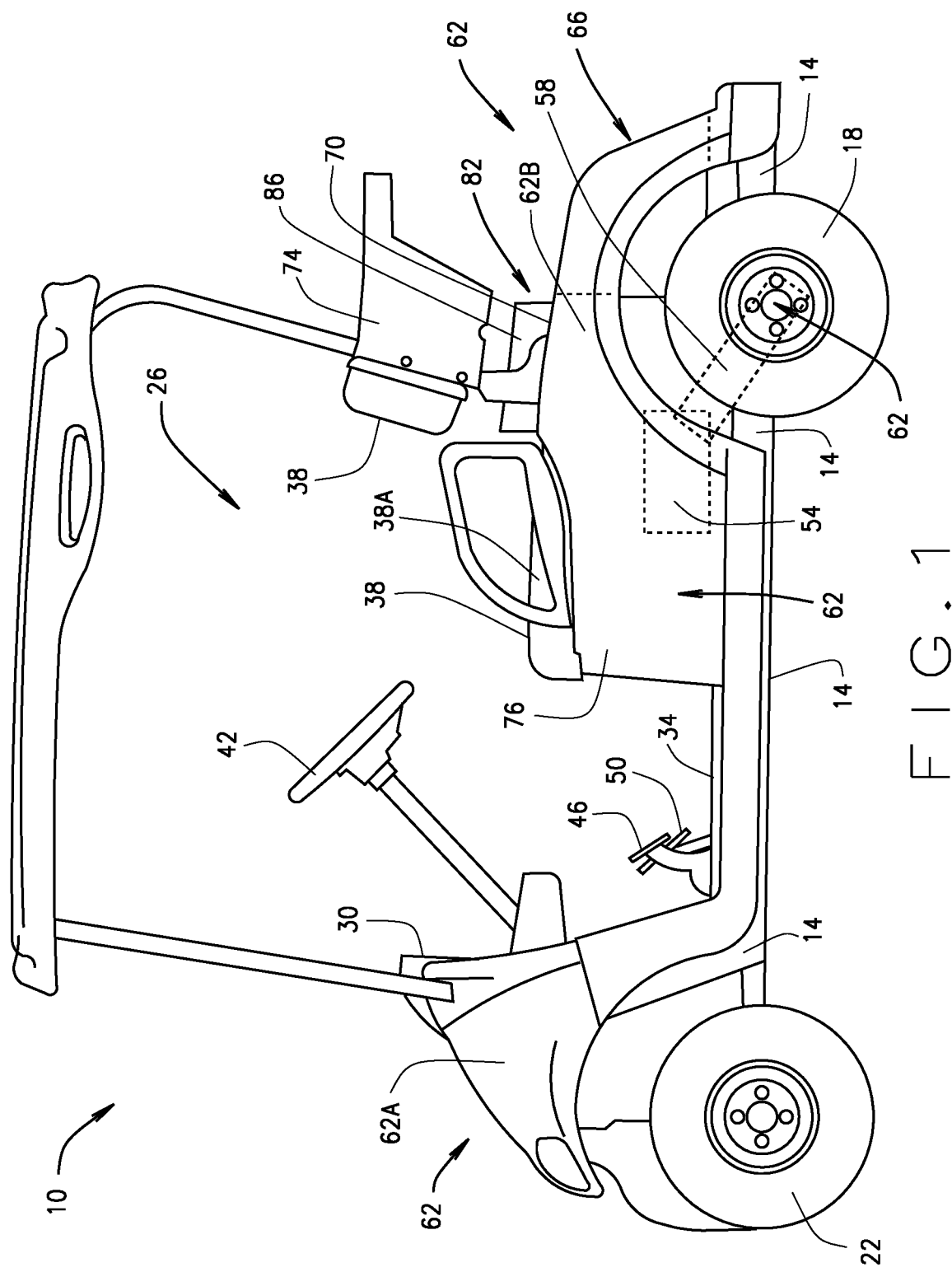
FIG. 1 is a side view of a golf car including an auxiliary storage compartment, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
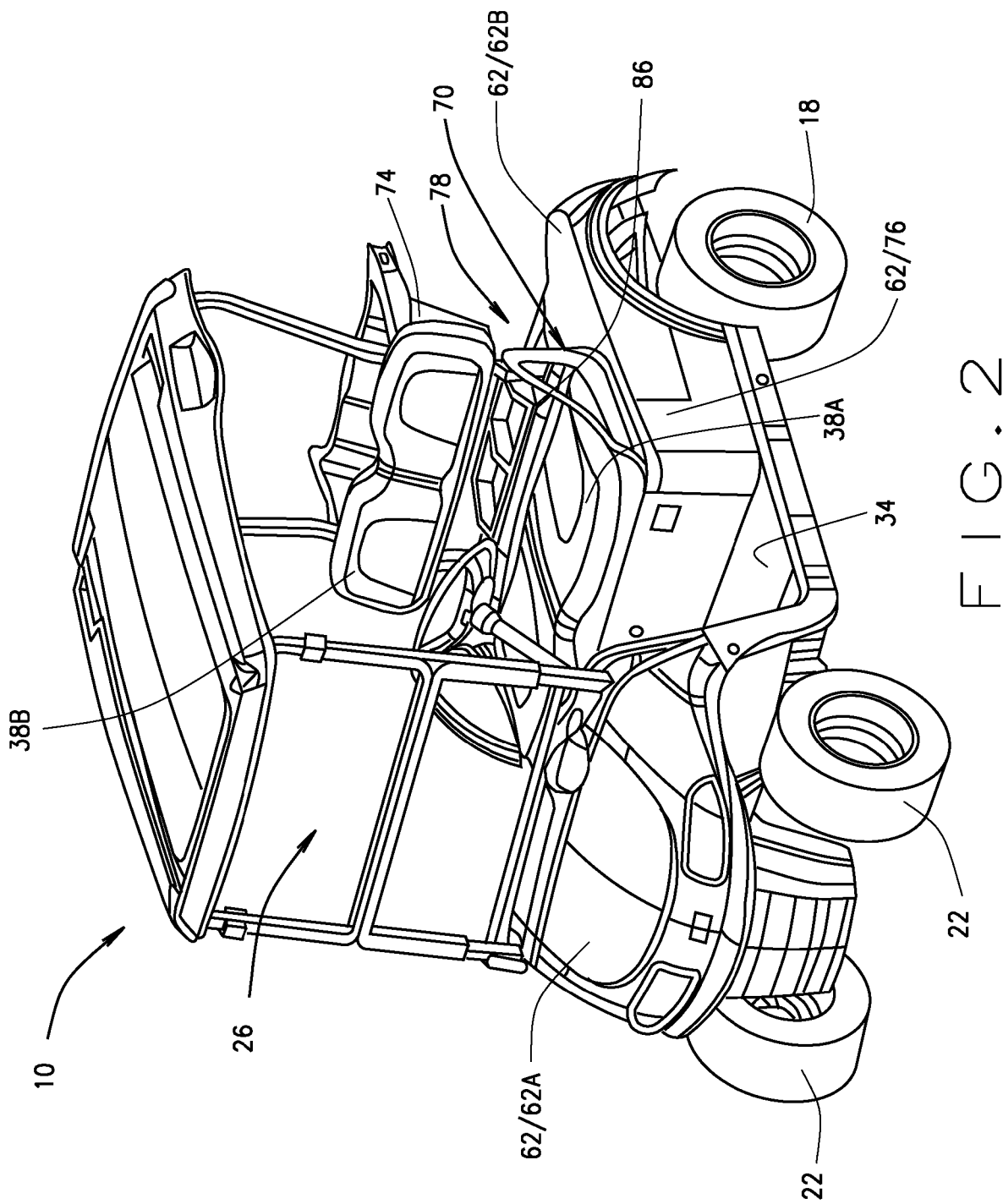
FIG. 2 is an isometric view of the golf car shown in FIG. 1 including the auxiliary storage compartment, in accordance with various embodiments of the present disclosure.
Figure 3:
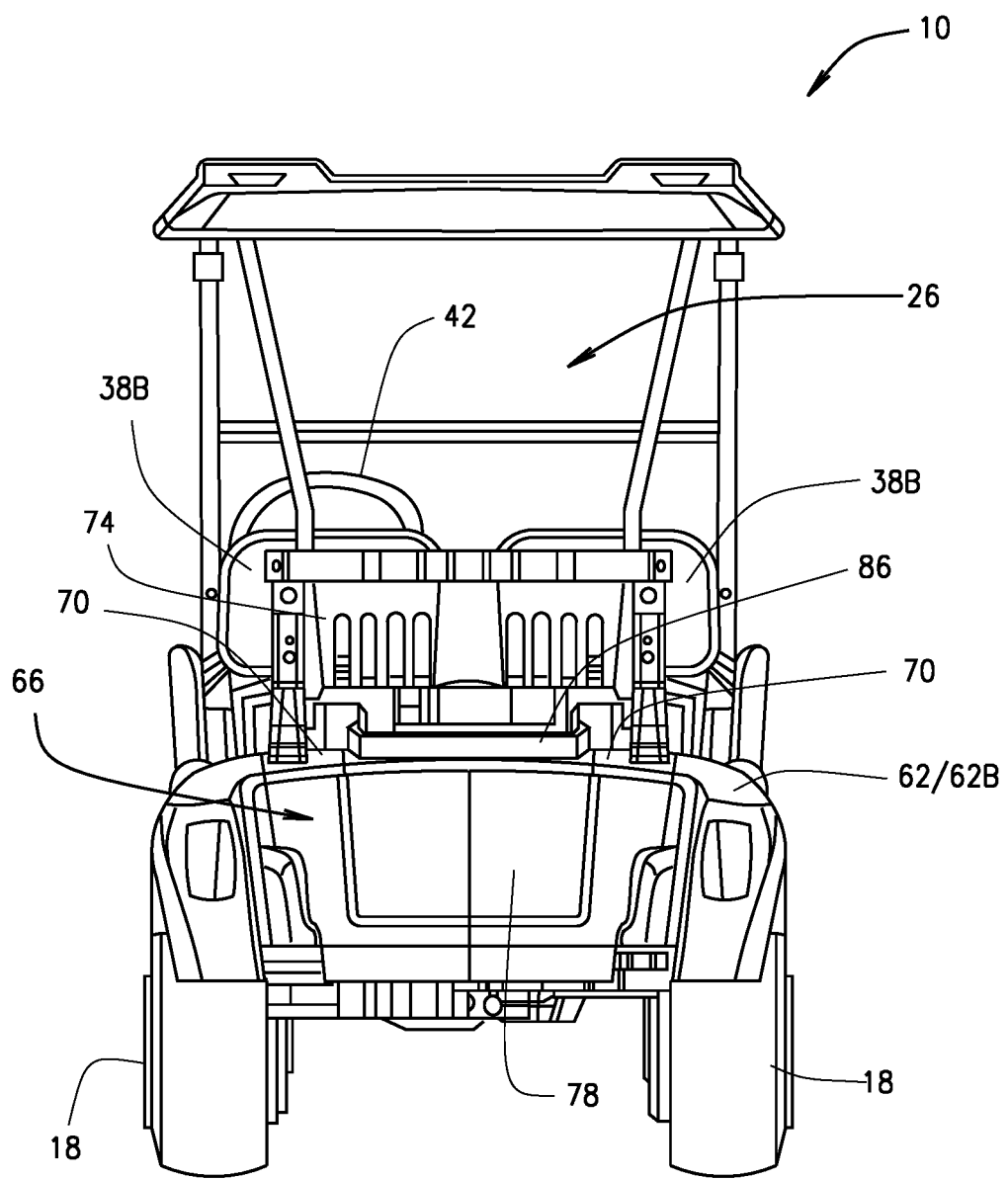
FIG. 3 is a rear view of the golf car shown in FIG. 1 including the auxiliary storage compartment, in accordance with various embodiments of the present disclosure.
Figure 4:
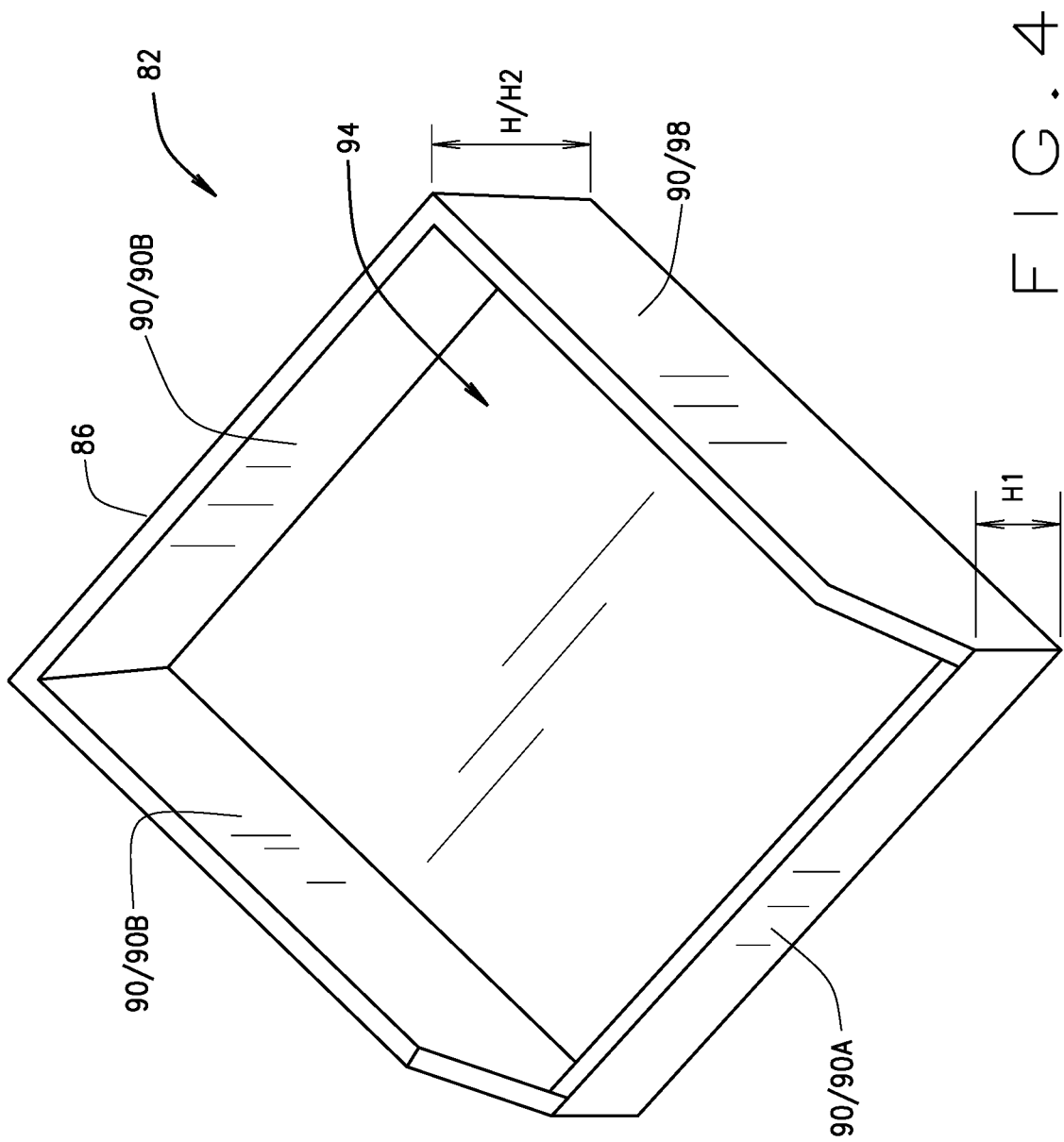
FIG. 4 is an isometric view of the golf car auxiliary storage compartment shown in FIG. 1, in accordance with various embodiments of the present disclosure.

Referring to FIGS. 1, 2 and 3, in various embodiments, the present disclosure provides a golf car 10 that generally includes a chassis or frame 14, a pair of rear wheels 18 and a pair of front wheels 22 operationally connected to the chassis 14, and a passenger compartment 26. As used herein, the word "wheel(s)" will be understood to mean the structure consisting of the respective tire mounted on the respective wheel, also known as the rim, particularly, the compilation of the tire and wheel/rim.

The passenger compartment 26 generally includes a dash console 30, a floorboard 34, and a passenger seating structure 38 structured and operable to provide seating for one or more golf car occupants, e.g., a driver and one or more passengers. The dash console 30 can include one or more instrument displays, gauges, vehicle control devices and/or storage compartments. For example, in various instances the dash console 30 can include one or more of a vehicle On/Off key switch for controlling the operation mode of the golf car 10, a forward/neutral/reverse selector, one or more small accessory storage pockets, one or more telemetry gauges/readouts (e.g., a speedometer, tachometer, temperature gauge, etc.) an electronic display (e.g., an LCD display that can have touch capabilities), a radio, and/or various other vehicle controls. The floorboard 34 is structured and operable to enclose a bottom of, and provide a floor for, the passenger compartment 26. The passenger compartment 26 additionally includes a steering wheel 42 for use by the operator to control the directional movement of the golf car 10, a brake pedal 46 for use by the operator to control slowing and stopping of the golf car 10, and an accelerator pedal 50 for use by the operator to control the torque delivered by a prime mover(s) 54 (described below) to one or more of the rear and/or front wheels 18 and/or 22.

As described above, the vehicle 10 additionally includes a prime mover 54 operatively connected to a drivetrain 58 that is operatively connected to at least one of the rear and/or front wheels 18 and/or 22. The prime mover 54 can be any device that is structured and operable to generate torque (e.g., motive force, e.g., power) utilized to provide motive force for the golf car 10 via the drivetrain 58. For example, the prime mover 54 can be an internal combustion engine (ICE), an electric motor, a hybrid combination of an ICE and an electric motor, or any other suitable motive power source and remain within the scope of the present disclosure. Although the drivetrain 58 of the present disclosure will, by way of example, will be shown and described herein as structured and operable to deliver motive force to the rear wheel(s) 18, via an axle assembly 62 (shown by way of example as a rear axle assembly), it should be understood that, in various embodiments, the drivetrain 58 of the present disclosure can be structured and operable to deliver motive force to the front wheel(s) 22, via a front axle assembly (not shown, but readily understood by one skilled in the art), and remain within the scope of the present disclosure. In yet other embodiments, it is envisioned that drivetrain 58, as described herein can be implemented in a four-wheel drive vehicle including a power take off assembly (not shown, but readily understood by one skilled in the art) operable to deliver motive force (i.e., power/torque) generated by the prime mover 54 to one or more of the front wheel(s) 22 and/or rear wheel(s) 18.

As used herein, the word "forward" and the phrase "forward of" are used to describe the direction from a named component or structure toward the front of the golf car 10. For example, the statement that the prime mover 54 is mounted to the chassis 14 "forward of" the longitudinal center means the prime mover 54 is mounted to the chassis 14 within an area that extends from the longitudinal center of the chassis 14 to the front of the chassis 14 at the front of the golf car 10 (e.g., adjacent the front wheels 22 positioned at the front of the golf car 10 in the illustrated embodiment). Similarly, as used herein, the word "rearward" and the phrase "rearward of" are used to describe the direction from a named component or structure toward the rear of the golf car 10. For example, the statement that the prime mover 54 is mounted to the chassis 14 "rearward of" the longitudinal center means the prime mover 54 is mounted to the chassis 14 within an area that extends from the longitudinal center of the chassis 14 to the rear of the chassis 14 at the rear of the golf car 10 (e.g., adjacent the rear wheels 18 positioned at the rear of the golf car 10 in the illustrated embodiment).

The golf car 10 further comprises a vehicle body 62 mounted to the chassis 14. In various embodiments, the vehicle body 62 comprises at least a front cowl assembly 62A disposed forward of the passenger compartment 26, and a rear deck and bag well assembly 62B disposed at least partially rearward of the passenger compartment 26. The rear deck and bag well assembly 62B includes a bag well 66 and a rear deck 70. The bag well 66 is provided or formed in a rear portion of the rear deck and bag well assembly 62B at the rear end of the golf car 10 and is structured and operable to have golf bags placed and retained therein. The rear deck 70 is provided or formed forward of the bag well 66, and rearward of a seat bottom 38A of the seating structure 38. If a sweater basket 74 is provided, the rear deck is disposed below the sweater basket 74 of the golf car 10. In various embodiments, the rear deck and bag well assembly 62B additionally comprises a seating structure pedestal 76 provide or formed forward of the rear deck 70 and structured and operable to support the seat bottom 38A of the seating structure 38.

In various embodiments, the rear deck and bag well assembly 62B can included a removable access panel 78 that provides at least portion of a forward wall of the bag well 66 and/or at least a portion of the rear deck 70. The access panel 78 is removable to allow access to components of the golf car 10, such as the prime mover 54 and drivetrain 58, etc. that are disposed beneath the rear deck and bag well assembly 62B.

The golf car 10 further comprises an auxiliary storage compartment 82 disposed rearward of the seating structure seat bottom 38A that is structured and operable to retain various passenger personal items such as cell phones, keys, range finders, towels, golf balls, golf club head covers, hats, sun glasses, etc. The auxiliary storage compartment (ASC) 82 is conveniently located on the rear deck 70 behind, or rearward, of the seating structure seat bottom 38A and is accessible by a passenger seated in the seating structure 38. For example, in various instances the ASC 82 is accessible via a space between the seating structure seat bottom 38A and one or more seating structure back rests 38B (see FIG. 2), or in instances where the seating structure 38 comprises a plurality of back rests 38B, the ASC 82 can be further accessible via a space between the back rests 38B. In various instances, the ASC 82 comprises a storage receptacle 86 disposed on the rear deck 70 behind and accessible by a passenger sitting in the seating structure 38. In the embodiments wherein the golf car 10 includes the sweater basket 74, the ASC 82 is disposed on the rear deck 70 beneath, or below, the sweater basket 74

Referring now to FIGS. 1, 2, 3 and 4, the storage receptacle 86 comprising at least one sidewall 90 that defines an interior storage space 94 of the storage receptacle 86. Although the storage receptacle 86 is exemplarily illustrated in FIG. 4 as having a substantially square shape, the storage receptacle 86 can have any desired shape, e.g., square, rectangular, round, triangular, hexagonal, polygonal, etc., and remain within the scope of the present disclosure.

In various embodiments, the at least one sidewall 90 comprises a front wall 90A and at least one main wall 90B that connects to the front wall 90A. For example, in embodiments wherein the storage receptacle 86 has a generally round shape, the at least one sidewall 90 could comprise a front wall 90A that provides a portion of the circular sidewall 90, and one main wall 90B that provides the remainder of the circular sidewall 90 and connects to both ends of the front wall 90A. Or, for example, in embodiments wherein the storage receptacle 86 has a substantially square, rectangular, triangular, hexagonal, or other polygonal shape (as exemplarily shown in FIG. 4), the at least one sidewall 90 could comprise a front wall 90A that provides one side of the sidewall 90, and a plurality of main walls 90B that provide the remainder of the sides of substantially square, rectangular, triangular, or hexagonal shaped sidewall 90 and connect to both ends of the front wall 90A.

In various embodiments, the sidewall(s) 90 has/have a consistent height H around the entire perimeter of the storage receptacle 86. For example, in various instances the height H of the sidewall(s) 90 around the entire perimeter of the storage receptacle 86 can be 1 to 6 inches or more, e.g., 3 to 4 inches. However, in alternative embodiments, the front wall 90A has a first height H1 and the main wall(s) 90B has/have a second height H2, wherein the height H1 of the front wall 90A is less than the height of the main wall(s) 90B. For example, in various instances the height H1 of the front wall 90A can be 1 to 2 inches and the height H2 of the main wall(s) 90B can be 2 to 6 inches (e.g., 3 to 4 inches).

As described above, the auxiliary storage compartment (ASC) 82 is conveniently located on the rear deck 70 behind, or rearward, of the seating structure seat bottom 38A and is accessible by a passenger seated in the seating structure 38. More particularly, the storage receptacle 86 can be integrally formed with the rear deck 70 or connected thereto using any suitable connecting means, e.g., screws, bolts, rivets, clamps, glue, etc. Moreover, the storage receptacle 86 can be fixedly or removable connected to the rear deck 70. For example, in various instances the storage receptacle 86 can be fixedly connected by being integrally formed with, or screwed, bolted, riveted, glued, etc., to the rear deck 70. Or, in other instances the storage receptacle 86 can be removable connected to the rear deck 70 using clamps, thumb screws, snaps, buttons, etc. Additionally, as also described above, in various embodiments, the rear deck and bag well assembly 62B can included the removable access panel 78 that provides or forms at least portion of the forward wall of the bag well 66 and/or at least a portion of the rear deck 70. In such embodiments, wherein the removable access panel 78 provides or forms at least portion of the rear deck 70, the storage receptacle 86 can be integrally formed with, fixedly connected to, or removable connected to the access panel 78 in the same manner as described above.

Figure 5:
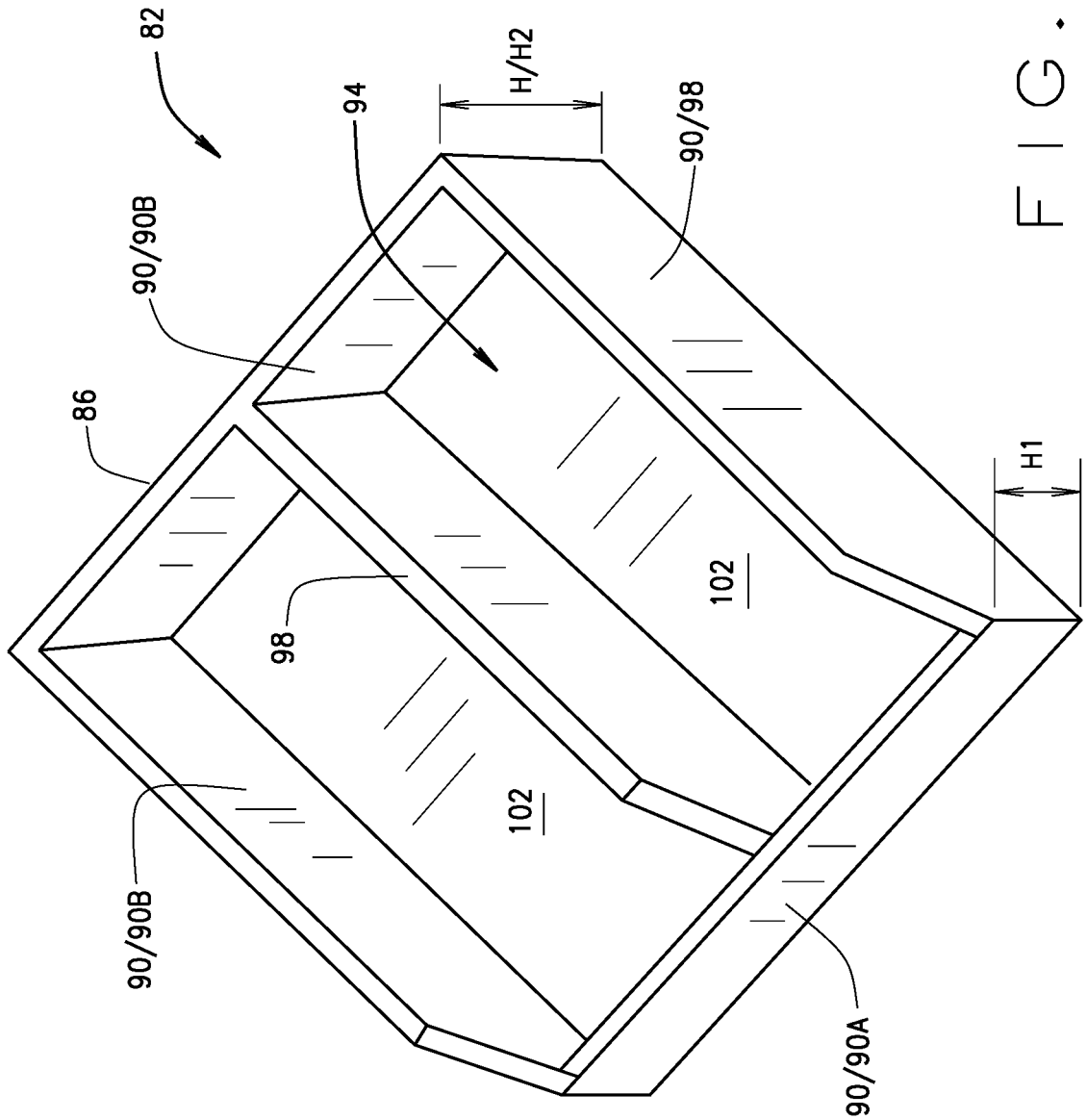
FIG. 5 is an isometric view of a storage receptacle of the auxiliary storage compartment including one or more wall, partition, ridge, etc., in accordance with various embodiments of the present disclosure.
Figure 6:
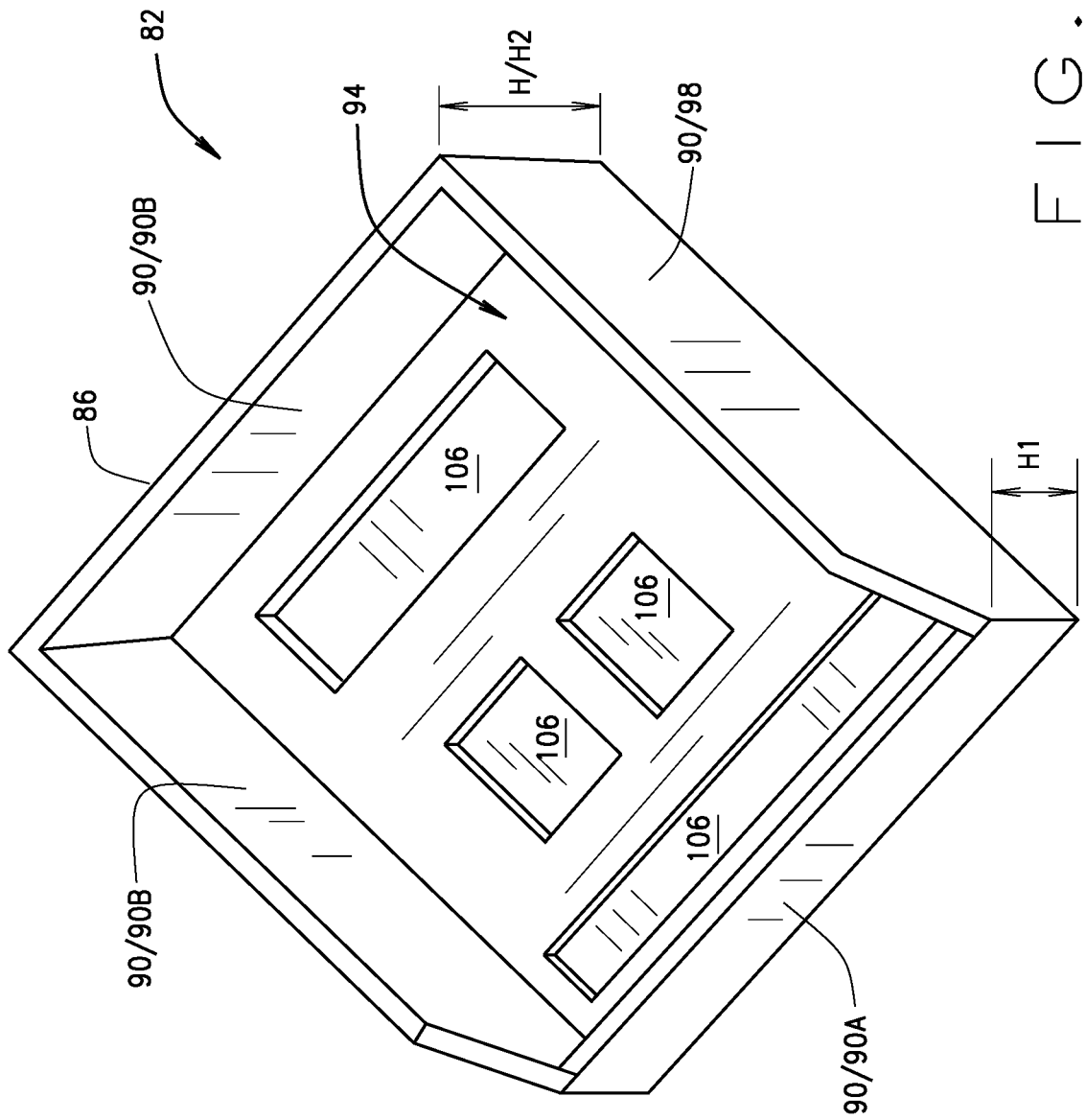
FIG. 6 is an isometric view of the storage receptacle of the auxiliary storage compartment including one or more channel or reservoir, in accordance with various embodiments of the present disclosure.

Referring now to FIG. 5, as described above, the storage receptacle 86 can have any shape and size suitable for retaining various passenger personal items such as cell phones, keys, range finders, towels, golf balls, golf club head covers, hats, sun glasses, etc. It is further envisioned that in various embodiments, the storage receptacle 86 can comprise one or more wall, partition, ridge, etc., 98 that is/are structured and operable to subdivide the interior storage space 94 into two or more sub-compartments 102, such the various passenger personal items can be separated within the storage receptacle 86. Additionally, with reference to FIG. 6, it is still further envisioned that in various embodiments, the storage receptacle 86 can comprise one or more integrated feature, channel, reservoir, etc., 106 formed in a bottom panel of the storage receptacle 86 that is/are structured and operable to provide features for retaining smaller and/or specific passenger personal items. For example, a particular integrated feature 106 can be sized and shaped specifically for retaining sunglasses, and/or a particular integrated feature 106 can be sized and shaped for holding smaller items such as keys are a wallet, and/or particular integrated feature 106 can be sized and shaped for retaining a beverage container, bottle or can, etc.

Although the golf car 10 has been described above as being a golf car, it is envisioned that in various embodiments the golf car 10 can be a maintenance vehicle, a cargo vehicle, a shuttle vehicle, an all-terrain vehicle (ATV), a utility-terrain vehicle (UTV), a worksite vehicle, a buggy, a light-weight vehicle, or any other suitable type of utility or low-speed vehicle that is not designated for use on road-ways, are remain within the scope of the present disclosure.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An auxiliary storage compartment for a light-weight utility vehicle, said compartment comprising:
    a storage receptacle disposable on a rear deck of a body of a utility vehicle behind and accessible from a seating structure of the utility vehicle, the storage receptacle comprising:
    a front wall;
    at least one main wall that connects to opposing ends of the front wall to define an interior storage space of the storage receptacle; and
    at least one divider that divides the interior storage space of the storage receptacle into a plurality of storage areas, wherein the storage receptacle is disposable on a rear deck of a body of a utility vehicle such that the interior storage space is accessible via a space between a seat bottom of the seating structure and a seat back of the seating structure.

2. The auxiliary storage compartment of claim 1, wherein the storage receptacle further comprises a bottom including at least one integrated feature structured to retain at least one personal article of a vehicle passenger.

3. The auxiliary storage compartment of claim 1, wherein the storage receptacle is structured to be fixedly connected to the rear deck of the body of a utility vehicle.

4. The auxiliary storage compartment of claim 3, wherein the storage receptacle is structured to be fixedly connected to an access panel that provides at least a portion of the rear deck of the body of a utility vehicle.

5. The auxiliary storage compartment of claim 1, wherein the storage receptacle is structured to be integrally formed with the rear deck of the body of a utility vehicle.

6. The auxiliary storage compartment of claim 5, wherein the storage receptacle is structured to be integrally formed with an access panel that provides at least a portion of the rear deck of the body of a utility vehicle.

7. The auxiliary storage compartment of claim 1, wherein the height of the at least one main wall is 3-4 inches.

8. A utility vehicle, said utility vehicle comprising:
    a chassis;
    a pair of front wheels and a pair of rear wheels operationally connected to the chassis;
    a passenger compartment supported by the chassis, the passenger compartment comprising:
        a dash console;
        a floorboard; and
        a passenger seating structure having seat bottom and a seat back;
    a body mounted to the chassis, the body comprising a front cowl assembly disposed forward of the passenger compartment, and a rear deck and bag well assembly disposed at least partially rearward of the passenger compartment;
    a sweater basket disposed behind the passenger seating structure and above the rear deck; and
    an auxiliary storage compartment, the auxiliary storage compartment comprising:
        a storage receptacle disposed on a rear deck of the rear deck and bag well assembly of the body beneath the sweater basket, the storage receptacle comprising a front wall and at least one main wall that connect to opposing ends of the front wall to define an interior storage space of the storage receptacle, wherein the interior storage space is accessible via a space between the seat bottom and the seat back.

9. The golf car vehicle of claim 8, wherein the storage receptacle comprises at least one divider that divides the interior storage space of the storage receptacle into a plurality of storage areas.

10. The golf car vehicle of claim 8, wherein the storage receptacle further comprises a bottom including at least one integrated feature structured to retain at least one personal article of a vehicle passenger.

11. The golf car of claim 8, wherein the storage receptacle is fixedly connected to the rear deck.

12. The golf car vehicle of claim 11, wherein the rear deck and bag well assembly of the body comprises an access panel that provides at least a portion of the rear deck and the storage receptacle is fixedly connected to the access panel.

13. The golf car vehicle of claim 8, wherein the storage receptacle is integrally formed with the rear deck.

14. The golf car vehicle of claim 13, wherein the rear deck and bag well assembly of the body comprises an access panel that provides at least a portion of the rear deck and the storage receptacle is integrally formed with the access panel.

15. The golf car vehicle of claim 8, wherein the height of the at least one main wall is 3-4 inches.

* * * * *